United States Patent
Wan et al.

(10) Patent No.: US 11,610,342 B2
(45) Date of Patent: Mar. 21, 2023

(54) INTEGRATED AUGMENTED REALITY SYSTEM FOR SHARING OF AUGMENTED REALITY CONTENT BETWEEN VEHICLE OCCUPANTS

(71) Applicant: Ford Global Technologies, LLC, Dearborn, MI (US)

(72) Inventors: Jian Wan, Novi, MI (US); Prayat Hegde, Dearborn, MI (US); Reates Curry, Ann Arbor, MI (US); Mike Bloomer, Ann Arbor, MI (US); Harald C. Martinez, Northville, MI (US); Brett Stottlemyer, West Bloomfield, MI (US); Jeffrey Allen Greenberg, Ann Arbor, MI (US); Kwaku Prakah-Asante, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 65 days.

(21) Appl. No.: 17/024,010

(22) Filed: Sep. 17, 2020

(65) Prior Publication Data
US 2022/0084256 A1    Mar. 17, 2022

(51) Int. Cl.
| | |
|---|---|
| G09G 5/00 | (2006.01) |
| G06T 11/00 | (2006.01) |
| G06T 7/73 | (2017.01) |
| G06T 7/33 | (2017.01) |
| G01S 19/01 | (2010.01) |
| G06V 20/59 | (2022.01) |
| G06V 40/16 | (2022.01) |

(52) U.S. Cl.
CPC ............. *G06T 11/00* (2013.01); *G01S 19/01* (2013.01); *G06T 7/33* (2017.01); *G06T 7/73* (2017.01); *G06V 20/59* (2022.01); *G06V 40/171* (2022.01); *G06T 2207/30252* (2013.01)

(58) Field of Classification Search
CPC ....... G06T 19/006; G06T 19/00; G06F 3/011; G06F 3/012; G02B 27/017
USPC .......................................................... 345/633
See application file for complete search history.

(56) References Cited

U.S. PATENT DOCUMENTS

| | | | |
|---|---|---|---|
| 2014/0081634 A1* | 3/2014 | Forutanpour ........... | G06F 40/58 704/235 |
| 2014/0098132 A1* | 4/2014 | Fein ...................... | G06T 19/006 345/633 |
| 2016/0042543 A1* | 2/2016 | Hashimoto ........ | H04N 5/23293 345/629 |
| 2016/0240012 A1 | 8/2016 | Gruenler et al. | |

(Continued)

FOREIGN PATENT DOCUMENTS

DE    102018201769 A1    8/2019

OTHER PUBLICATIONS

Rao et al., "AR-IVI—Implementation of In-Vehicle Augmented Reality", IEEE International Symposium on Mixed and Augmented Reality Science and Technology Proceedings, 6 pgs., Sep. 2014.

*Primary Examiner* — Gordon G Liu
(74) *Attorney, Agent, or Firm* — Brandon Hicks; Everheds Sutherland (US) LLP

(57) ABSTRACT

A method and system for providing integrated augmented reality (AR) images and content to multiple vehicle occupants having AR devices and methods of generating user-based AR expressions including content control of user generated content.

19 Claims, 7 Drawing Sheets

(56) References Cited

U.S. PATENT DOCUMENTS

| | | | |
|---|---|---|---|
| 2017/0192091 A1 | 7/2017 | Felix | |
| 2018/0047216 A1* | 2/2018 | Mullins | G06F 8/38 |
| 2018/0154832 A1* | 6/2018 | Park | G06T 11/60 |
| 2019/0166352 A1* | 5/2019 | Alaniz | H04N 13/344 |
| 2021/0134248 A1* | 5/2021 | Wan | G06K 9/00671 |

* cited by examiner

INTEGRATED AUGMENTED REALITY SYSTEM FOR SHARING OF AUGMENTED REALITY CONTENT BETWEEN VEHICLE OCCUPANTS

TECHNICAL FIELD

The present disclosure relates to a vehicle integrated augmented reality system, and more particularly, to an augmented reality system for automobile occupants that achieves persistency and allows sharing of augmented reality content.

BACKGROUND

Enhanced perception and realization of the external environment for the mobile customer when driving or riding in a vehicle is of significant value. Augmented Reality (AR) may assist in focusing the cognitive effort of users (e.g., vehicle drivers) by superimposing relevant information into the visual field-of-view of the user. In other aspects, AR may assist non-driving users (e.g., riders in a vehicle) by enhancing their perception and realization of the external environment with interactive games, animations, and other experiences that may be shared with multiple users of an AR system in a vehicle.

Vehicle-based AR systems can operate using a variety of device configurations simultaneously, such as a Heads-Up Display (HUD) or a fixed display screen in a center stack or cluster, or they may be displayed on one or more portable devices, for example, wearables or smart phones. Delivery schemes for in-vehicle interactive content, such as center stack or cluster mount AR screens in conventional in-vehicle AR systems are known, as are handheld or dash mountable AR capable devices.

While multiple display devices are known to be capable of displaying the same generated AR content that is seen by the driver or other users within the same vehicle, currently, the same AR content is unable to be particularized to the individual display devices whose users are traveling together in a vehicle. Individual devices often render AR content independently, while changes to an AR presentation by one user are not shareable with other users in the in-vehicle group. While the same information may be projected to multiple user devices, there is no current way for users to modify the projected AR or share user modified AR content with the driver or other occupants of the vehicle.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
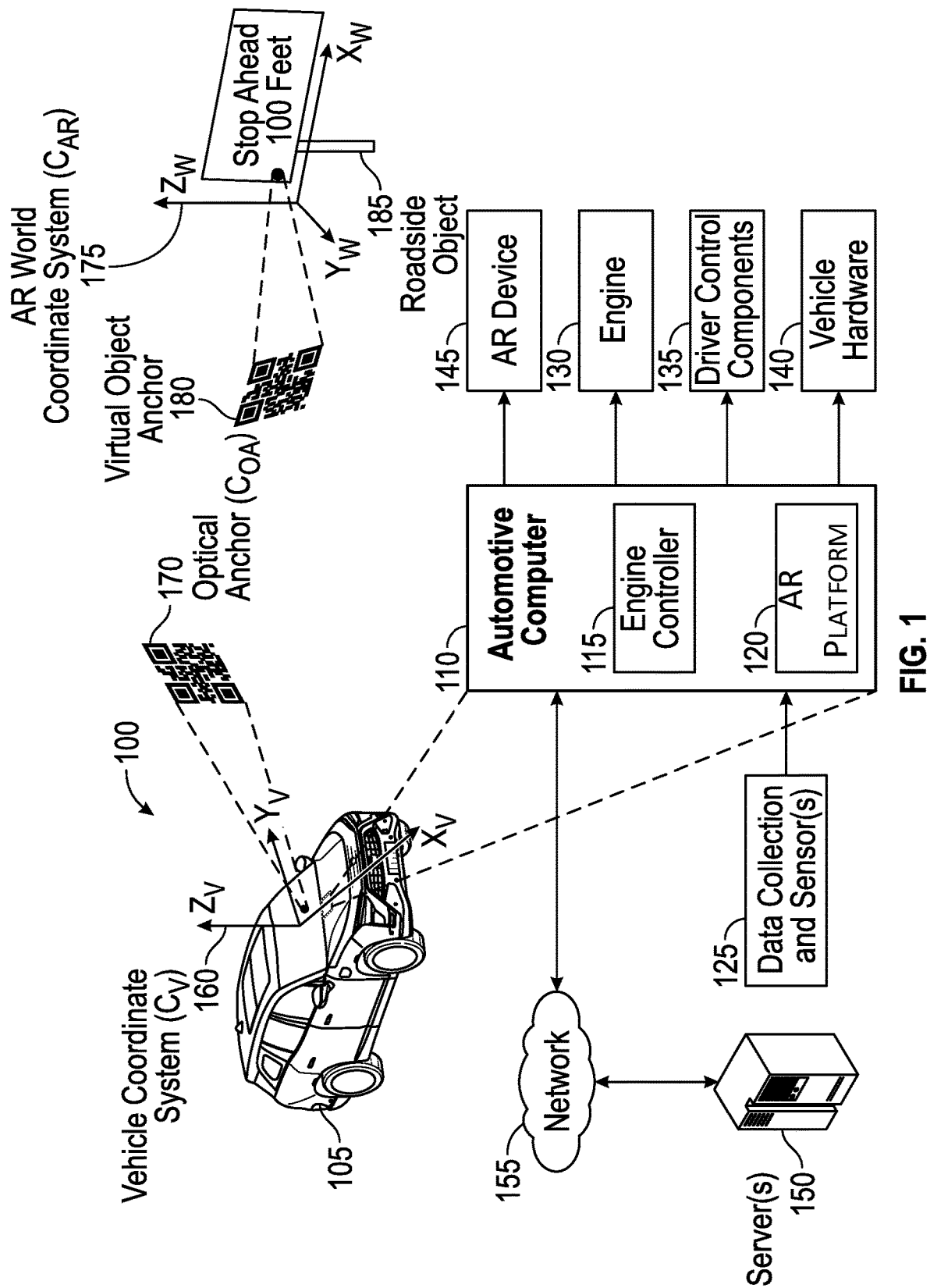
FIG. 1 depicts an illustrative architecture in which techniques and structures for providing the systems and methods disclosed herein may be implemented.

The systems and methods disclosed herein describe an integrated augmented reality (AR) system for a vehicle configured to display road-side information in front of an occupant's direct gaze when they are driving and/or riding in the vehicle, and in some embodiments, when the user exits the vehicle as well. The disclosed system may include two or more AR devices, for example, AR wearables including AR glasses, AR goggles, AR contact lenses, etc.; AR mobile devices including smart phones, tablets, etc.; AR screens, including integrated navigation screens; fixed display screens in a center stack or cluster, etc.; and AR Heads up Displays (HUD). The AR device(s) may display roadside information associated with one or more points of interest (POIs) to the user's field of vision when they are driving and/or riding in the configured vehicle. For example, in the AR view, the system may tag and display a POI to a location in the external physical world, whereby the users of the AR system in the vehicle may share an integrated and coordinated AR experience.

According to one embodiment, the system may determine a location of a roadside exterior object relative to the interior of the moving vehicle based on a vehicle Global Positioning System (GPS) message, a vehicle heading message, or other information. The system may synchronize a vehicle coordinate system with a virtual representation of the roadside object, and orient a user's AR device with the synchronized vehicle coordinate system. The vehicle itself, and more particularly, the centralized AR system, may act as a hub by performing the AR presentation centrally, and use computing logic to determine, for users in the vehicle, user identities, associate permission levels with particular users, and present a common AR experience that may be changed in some way by one or more users. The centralized AR system may perform the renderings onboard the vehicle at the AR presentation layer, which is independent of the individual devices, determine the users to share aspects of the information with, and present a customized AR presentation to these individual users where some information is shared commonly among the group, and other information is selectively presented to particular devices according to the user identities and permissions. The AR system may determine an identity of a user of the AR system, and generate, based at least in part on the user ID associated with the user of the AR device, a first virtual representation of the roadside object aligned with a GPS location and a direction of the vehicle. The system may transmit the first virtual representation to the AR device, where it is presented in the visual field of view of the user to enhance the user's perception and realization of the external environment outside the moving vehicle.

Multiple vehicle occupants can view a personalized virtual image at the same time, which may include persistent AR projections that can be individualized for each user. Because the AR presentation layer is centralized onboard the configured vehicle and not independently to each of the connected AR devices, all users may also interact with, and modify, the AR projections, making a personalized and/or coordinated AR experience possible for all the authorized occupants of the vehicle. Moreover, system users with a wireless or mobile internet connection may use the vehicle AR system even after the occupants exit the vehicle. These and other advantages of the present disclosure are provided in greater detail herein.

Illustrative Embodiments

The disclosure will be described more fully hereinafter with reference to the accompanying drawings, in which exemplary embodiments of the disclosure are shown.

FIG. 1 illustrates an example computing environment 100 for practicing methods described herein. According to one embodiment, a vehicle 105 may travel a road or other route (not shown in FIG. 1), and approach a point of interest, such as, for example, a roadside object 185. Although depicted as a road sign, the roadside object 185 may be any object observable by occupants of the vehicle 105, such as, for example, a building, a landmark, a geographic feature, or any other type of object having a physical location external to the vehicle. The roadside object 185 may be any observable external point of interest, which may be an object, a person, an event (e.g., an automobile collision), a weather condition, an animal, or any other physical manifestation of interest to a vehicle occupant. Stated another way, the roadside object 185 may be a point of interest (POI) that can take the form of any of the above examples, which are not intended to be limiting, or may take another physical form.

The vehicle 105 may be any type of passenger vehicle, such as, for example, a sedan, a bus, a van, a truck, etc. In some aspects, the vehicle 105 may operate as a manually-controllable vehicle, an autonomous vehicle where driving functionality is performed entirely by a computing platform onboard and/or offboard the vehicle 105, or a semi-autonomous vehicle where aspects of the vehicle control are automatic and other aspects are user-controlled.

The vehicle 105 may include an engine 130, which may be and/or include a combustion engine, an electric motor, a hybrid drive system, and/or another actuation system.

The vehicle 105 can include an automotive computer 110. The automotive computer 110 may be installed in an engine compartment of a vehicle 105 (or elsewhere in the vehicle 105) as part of a vehicle augmented reality (AR) system in accordance with this disclosure. The automotive computer 110 may communicate with and/or be a part of a remote computing platform associated with one or more server(s) 150, which may communicate via one or more network(s) 155. In some embodiments, the automotive computer 110 can include the network adaptor(s) (not shown in FIG. 1) for coupling to one or more network(s) 155.

The network(s) 155 may include one or more Internet protocol (IP)-based network(s) for communication between the automotive computer 110 and any external device. The network(s) 155 may transmit and receive data between the automotive computer 110 and devices and/or systems external to the automotive computer 110. For example, the automotive computer 110 may transmit occupant profile information associated with vehicle occupants (not shown in FIG. 1) to and from the server(s) 150, such that the automotive computer 110 may provide customized AR experiences to authorized vehicle occupants (who may be users of the AR system). The AR experiences may be customized, in some example embodiments, based at least in part on user profile information described herein as occupant identifiers. For example, and as described in greater detail hereafter, the automotive computer 110 may transmit to and/or from the server(s) 150, one or more AR preferences associated with individual system users, such as a navigation preference, an animation preference, an audio preference, an AR game setting, a character setting, a motion setting, a brightness setting, etc.

In an example embodiment, the network(s) 155 can be implemented in a wireless fashion, e.g., using wireless protocols and technologies, such as Wi-Fi, WiMAX, and/or the like. The network(s) 155 can also connect with and/or include a wired network, an Ethernet network, a controller area network (CAN), etc. The network(s) 155 may also be and/or include a packet-switched network such as a local area network, wide area network, metropolitan area network, the Internet, or other similar types of network environments. The network(s) 155 can be and/or include a wireless local area network (LAN), a wireless wide area network (WAN) a personal area network (PAN), a virtual private network (VPN), intranet or another suitable network system.

The automotive computer 110 may include an engine controller 115 for controlling an engine 130, for controlling one or more driver control components 135, and/or for controlling other vehicle hardware 140 such as, for example, an infotainment system, a Global Positioning System (GPS), etc.

Augmented reality (AR) may be described as an interactive experience of a real-world environment where the objects that reside in the real-world are enhanced by computer-generated perceptual information, sometimes across multiple sensory modalities, including, for example, visual, auditory, haptic, and other modalities. The sensory information can be overlaid in a constructive (i.e. additive to the natural environment), or destructive (i.e. masking of the natural environment) way such that a digital representation of the real-world environment (e.g., the roadside object 185) may be overlaid with a digital enhancement or other information that appears in the field-of-view of a user of the AR system.

As described in greater detail throughout the present disclosure, the automotive computer 110 may also include a vehicle augmented reality (AR) platform 120 for performing one or more aspects of the disclosure described herein. It should be appreciated that the vehicle AR platform 120, although depicted as part of the automotive computer 110, may also be part of or controllable entirely by the server(s) 150, and operate with the automotive computer 110 in a software as a service (SaaS) context. That is, the vehicle AR platform 120 may operate on the automotive computer 110 as a client service, where the automotive computer 110 is the client, and the server(s) 150 controls portions of the vehicle AR system, or the entire vehicle AR system depicted in FIG. 1. However, for ease of discussion, the vehicle AR platform 120 will be discussed based upon its location in the vehicle 105.

The engine controller 115, and/or the vehicle AR platform 120, may receive sensory information including environmental data from one or more data collectors or sensor(s) 125. The sensor(s) 125 may include any number of data collection devices or sensory devices configured or programmed to generate signals that help navigate the vehicle 105 while operating in a manual and/or an autonomous (e.g., driverless) mode. As an example, the sensor(s) 125 may include a depth camera, a video camera, etc., and may include computer vision software for detecting roadside situations and objects, such as pedestrian, traffic, road signs, etc. Additional examples of sensor(s) 125 may include a radar sensor, a light detection and ranging (LIDAR) device, a vision sensor, and/or the like. The sensor(s) 125 may help the vehicle 105 "see" the roadway and the vehicle surroundings and/or negotiate various obstacles while the vehicle is operating and in motion.

For example, FIG. 1 depicts the roadside object 185. The vehicle AR platform 120 depicted in FIG. 1 may add information to the roadside object 185, for example, a visual effect, an animation, a lighting effect, etc. In other aspects, the vehicle AR platform 120 depicted in FIG. 1 may remove information from the roadside object 185, such as, for example, graffiti or other information that could be distracting. In another example, the vehicle AR platform 120 of FIG. 1 may remove distracting information such as video output in a passing vehicle's output device that could distract a user of the vehicle AR platform 120 in FIG. 1. Although the limited examples provided herein describe particular AR experiences, it should be appreciated that an AR experience may take any form, limited only by the creativity of particular interactive applications that can be seamlessly interwoven with the physical world such that the AR experience is perceived as an immersive aspect of the real world environment. In this way, the AR systems described herein may alter and/or enhance one's ongoing perception of a real-world environment.

In one aspect, the AR systems described herein may interweave physical world objects such as the roadside object 185, which may change position with respect to the vehicle 105 as the vehicle 105 proceeds towards a destination, with holographic projections of virtual objects, colors, etc. Physical objects inside of the vehicle 105 may also be part of the AR experience, such that a user's vantage point of the roadside object 185 is coordinated with aspects of the user's physical environment in the interior of the vehicle 105. The vehicle AR platform 120, as described herein, may do this by receiving, from one or more integrated cameras (not shown in FIG. 1) associated with the AR device 145, a video feed of the interior surfaces of the vehicle 105 and the exterior roadside scenes such as the roadside object 185, and establishing a unified coordinate system that coordinates interior surfaces of the vehicle 105 with real-world objects outside of the vehicle 105. The unified coordinate system may provide an AR experience that integrates the exterior roadside object 185 with the interior surfaces of the vehicle 105. For example, the vehicle AR platform 120 may track the position of the AR device 145, such that the vehicle AR platform 120 may represent the exterior roadside object 185 (and/or other object at an interior of the vehicle) in virtual AR space that seamlessly coordinates with the user's view of the vehicle interior, while changing the AR space in real time according to the physical position of the user's AR device 145.

Any available coordinate system that can coordinate the position of the real world objects with AR projections can be used in the method as described. One embodiment of a coordinate system that may be used by the vehicle AR platform 120 to coordinate the position of real world objects with AR projections is depicted in FIG. 1 as AR world coordinate system 175 (described mathematically as "$C_{AR}$"). FIG. 1 depicts the vehicle 105 as being associated with a vehicle coordinate system 160 (described mathematically as "$C_V$"). In some embodiments, the vehicle coordinate system 160 may have a mathematical representation that is different from the AR world coordinate system 175. For example, the vehicle coordinate system 160 may be expressed in terms of one or more sets of Cartesian coordinates in a Cartesian coordinate system.

The AR world coordinate system 175 is mathematically described hereafter as "$C_{AR}$". In some aspects, the AR world coordinate system 175 may be mathematically represented in Cartesian coordinates. In some aspects, the roadside object 185 may be sensed by the one or more sensor(s) 125 as part of a GPS messaging system (not shown in FIG. 1), where the roadside object 185 is represented as a set of polar coordinates. Since polar coordinates are a different mathematical representation for orienting objects in physical 3D space than Cartesian coordinates, the AR platform 120, either alone or in conjunction with the AR device 145, should translate the polar coordinates to a unified coordinate system (e.g., into Cartesian coordinates).

In one or more example embodiments, the AR platform 120 may synchronize the AR world coordinate system 175 ($C_{AR}$) with the vehicle coordinate system 160 ($C_V$) using an optical anchor 170 (described mathematically as "$C_{OA}$"). The optical anchor 170 may have a fixed relationship with the vehicle coordinate system 160 such that, $$C_{OA} = F(C_V),$$

where the optical anchor 170 $C_{OA}$ is a function of the vehicle coordinate system 160 $C_V$. In one example embodiment, the AR platform 120 may coordinate the vehicle coordinate system 160 with the AR world coordinate system 175 using one or multiple 2D image targets (e.g., the optical anchor 170) on at least one interior surface of the vehicle 105, such as a dashboard or headliner (not shown in FIG. 1). The plane of an image target (depicted in FIG. 1 as a plane defined by planar arrows $Y_W$ and $Z_W$) may uniquely define two axes of the vehicle coordinate system 160, where a normal axis of the optical anchor 170 (defined as the vector arrow $X_W$) may define the 3rd axis in the coordinate system. In other aspects, other 3D interior surfaces of, for example, interior trims of the vehicle 105, or another component, can also serve as an optical anchor.

The various AR devices may include one or more cameras (not shown in FIG. 1) which are configured to obtain an image or plurality of images of the real world roadside object 185, including the virtual object anchor 180. In one aspect, the virtual object anchor 180 may provide information sufficient to form a virtual twin that defines the AR world coordinate system 175 ($C_{AR}$). The camera equipped in the AR devices may track the optical anchor 170, and match the optical anchor 170 with its virtual twin (the virtual object anchor 180), and thus, align a first coordinate system with a second coordinate system based at least in part on the vehicle 105 interior surface upon which the optical anchor 170 is disposed. Stated in another way, the AR world coordinate system 175 ($C_{AR}$) may be associated with the GPS coordinate system that is mappable to the real world roadside object 185.

In some embodiments, the vehicle AR platform 120 may continuously update the AR world coordinate system 175 such that it is synchronized with the vehicle coordinate system 160. Stated in another way, the $C_V$ is mapped in real-time to the AR world coordinate system 175 ($C_{AR}$).

The automotive computer 110 may include one or more processor(s), and a memory communicatively coupled to the one or more processor(s). The automotive computer 110 may operatively connect to and communicate information with one or more internal and/or external memory devices such as, for example, one or more databases via a storage interface, exemplified in the data storage and management module 221 of FIG. 2. For example, the automotive computer 110 may connect to and communicate information with an internal and/or external database, such as the occupant profile database (referenced as the user data) in data storage and management module 221 of FIG. 2.

The automotive computer 110 may include one or more network adaptor(s) enabled to communicatively connect the automotive computer 110 with the one or more network(s) 155. In some example embodiments, the network(s) 155 may be or include a telecommunications network infrastructure. In such embodiments, the automotive computer 110 can further include one or more communications adaptor(s).

Figure 2:
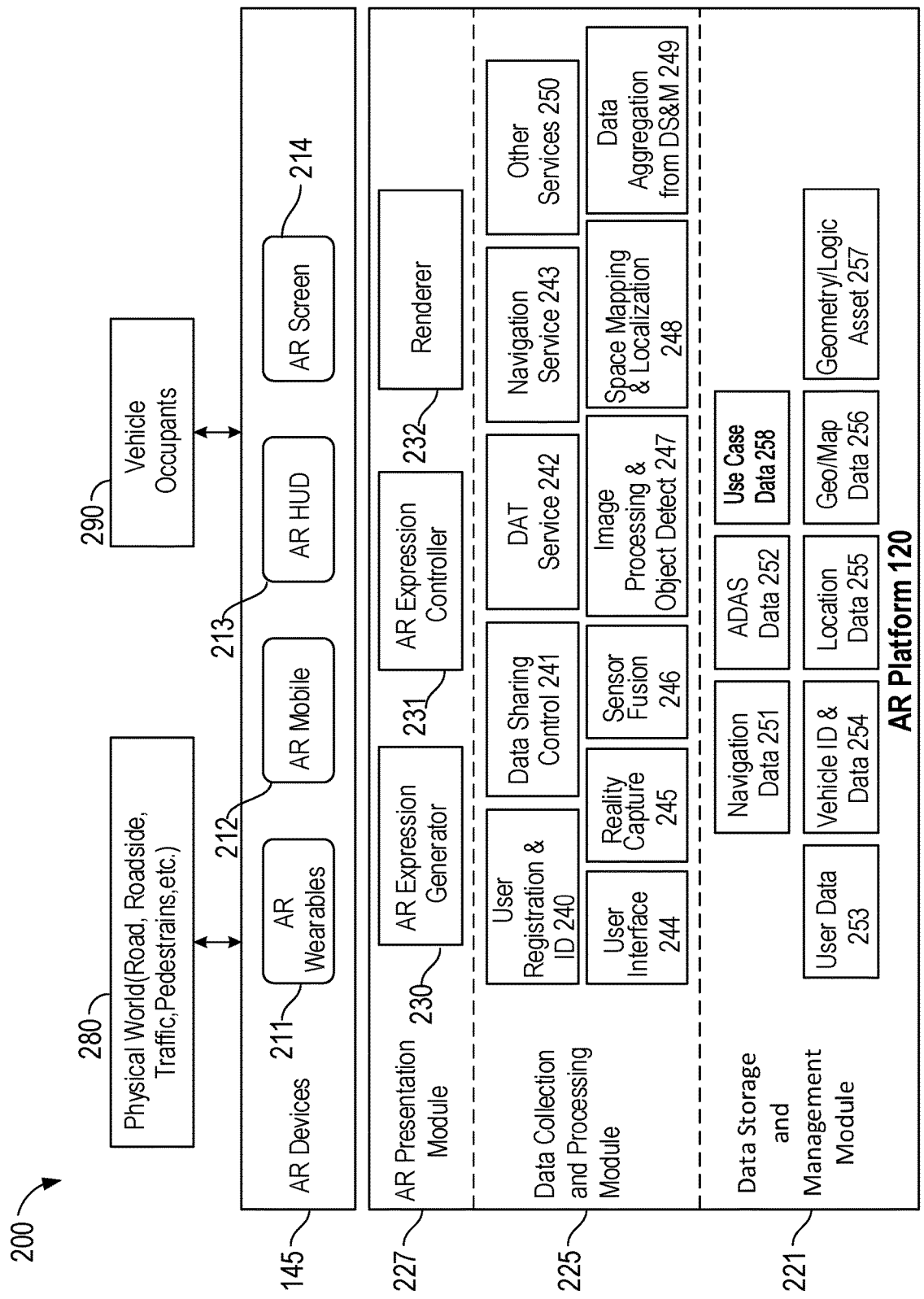
FIG. 2 is a system framework for a computing system utilized in accordance with the present disclosure.

The automotive computer 110 may further include and/or connect with one or more input devices (e.g., the sensor(s) 125 as shown in FIG. 1 and module 225 of FIG. 2) and/or one or more output devices (not shown in FIG. 1) through an I/O adapter.

The one or more processor(s) are collectively a hardware device for executing program instructions (aka software), stored in a computer-readable memory (e.g., the memory. The one or more processor(s) may embody a custom made or commercially-available processor, a central processing unit (CPU), a plurality of CPUs, an auxiliary processor among several other processors associated with the automotive computer 110, a semiconductor based microprocessor (in the form of a microchip or chipset), or generally any device for executing program instructions.

The one or more processor(s) may be disposed in communication with one or more memory devices (e.g., internal memory and/or one or more external databases, etc.) via a storage interface. The storage interface can also connect to one or more memory devices including, without limitation, one or more other memory drives including, for example, a removable disc drive, a vehicle computing system memory, cloud storage, etc., employing connection protocols such as serial advanced technology attachment (SATA), integrated drive electronics (IDE), IEEE-1394, universal serial bus (USB), fiber channel, small computer systems interface (SCSI), etc.

The memory can include random access memory (RAM) such as, for example, dynamic random access memory (DRAM), synchronous random access memory (SRAM), synchronous dynamic random access memory (SDRAM), etc., and read only memory (ROM), which may include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), etc.). Moreover, the memory can incorporate electronic, magnetic, optical, and/or other types of non-transitory computer-readable storage media. In some example embodiments, the memory may also include a distributed architecture, where various components are physically situated remotely from one another, but can be accessed by the one or more processor(s).

The instructions in the memory can include one or more separate programs, each of which can include an ordered listing of computer-executable instructions for implementing logical functions. The instructions in the memory can include an operating system. The operating system can control the execution of other computer programs such as, for example the AR platform 120, and/or the engine controller 115, and may provide scheduling, I/O control, file and data storage and management (e.g., module 221 from FIG. 2), memory management, and communication control and related services. The program instructions stored in the memory can further include application data and instructions for controlling and/or interacting with the computer through a user interface.

The I/O adapter can connect a plurality of input devices to the automotive computer 110. The input devices can include, for example, a keyboard, a mouse, a microphone, a sensor, etc. The I/O adapter can further include a display adapter coupled to one or more displays, for example, the vehicle hardware 140 which may include an infotainment system. The I/O adapter can be configured to operatively connect one or more input/output (I/O) devices to the automotive computer 110. For example, the I/O adapter can connect a keyboard and mouse, a touchscreen, a speaker, a haptic output device, or other output device. The output devices can include but are not limited to a printer, a scanner, and/or the like. Other output devices can also be included. Finally, the I/O devices connectable to the I/O adapter can further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

According to some example embodiments, the automotive computer 110 can include one or more communications adapter(s). The communications adapter(s) can include a global positioning system (GPS), cellular, mobile, and/or other communications protocols for wireless communication. In some aspects, the vehicle hardware 140 may communicate information to and from the automotive computer 110 via a communications adapter, which may include, for example, information associated with the AR platform 120 or the AR device(s) 145.

A communications adaptor may collect data from the vehicle 105, and transfer the data between the AR platform 120, the automotive computer 110, and/or the server(s) 150. The communication adaptor(s) and a communications module associated with the AR platform 120 may transfer information between the computing systems via one or more data transfer protocols including, for example, Wi-Fi, or Bluetooth®, Bluetooth Low-Energy®, and/or another data transfer protocol. Data transferred may include navigational messages including, for example, a vehicle location, a vehicle heading, one or more roadside detection results, and other information.

Network adaptor(s) may include one or more internet of things (IoT)-connected devices and/or modules such as, for example, a cloud module. The network adaptor(s) may connect the vehicle 105 to the network(s) 155 to retrieve data, such as weather and/or POI information. For example, the network adaptor(s) may connect with the network(s) 155 to obtain information associated with a landmark, a geographic feature, a road feature, a map, a building, a business, etc.

The automotive computer 110 may also include an occupant ID system that may identify one or more riders and/or drivers (collectively occupants) when they enter the vehicle, and retrieve occupant identifiers associated with the one or more occupants. The occupant ID system may assign a unique ID to individual users such that the occupant identifier includes occupant-specific information that may be used to provide a unique AR experience to each vehicle occupant. Example information may include, for example, navigation preferences, animation preferences, audio preferences, AR game settings, and other information that may indicate user-preferred AR settings. In other aspects, the occupant identifiers may include one or more details associated with the vehicle 105 such as, for example, a vehicle identification (ID), vehicle Quick Response (QR) encoding(s) that uniquely associate a particular vehicle interior with one or more database entries such as an occupant identifier, and one or more device identifiers that identify particular AR devices that have been associated with particular occupant(s).

In one embodiment, the processor(s) may receive, via a CAN network associated with the vehicle 105, an image of the user that is the driver having an AR device 145. Accordingly, one or more cameras (not shown in FIGS. 1-5) inside of the vehicle 105 may obtain a facial image of the driver user, and transmit the image to the processor(s) for user identification. Although multiple procedures for identification of users using facial recognition technology are possible (and contemplated), one example is provided. The processor(s) may generate a plurality of gradient vectors associated with the image of the user, such as, for example, gradient vectors associated with facial features of the user (e.g., distance between corners of the eyes, angle of respective features such as mouth and eye corners, etc.). The processor(s) may identify a least one facial landmark from the plurality of gradient vectors, and compare the at least one facial landmark to a plurality of facial landmarks associated with at least one prior occupant of the vehicle. For example, a facial landmark may include angles of the corners of the occupant's eyes and an angle formed between the corners of the user's mouth and a nasal feature. The at least one facial landmark may be identified from the plurality of gradient vectors, by retrieving occupant profile data associated with the user image. The processor(s) may determine a match associated with the at least one facial landmark and the landmark data associated with the profile data, and change one or more stored AR experience settings based at least in part on the occupant profile data. It should be appreciated that the facial recognition steps described herein are example steps only to illustrate known methods for determining user identity using facial features, and should not be considered limiting.

In one aspect, the occupant ID system may identify one or more riders and/or drivers (collectively "occupants") when they enter the vehicle 105, retrieve an occupant identifier associated with the one or more occupants, and assign a unique ID to each such that the occupant identifier includes occupant-specific information that may be used to provide a unique AR experience to each occupant. Example information of AR preferences may include, for example, one or more navigation preferences that may describe user preferences for interacting with navigational aspects of the AR device 145. In one example, a navigational preference may be related to and/or include a color code associated with a direction of travel, navigational instruction, a travel direction presented to the viewer, and/or any other possible navigational preference associated with providing and/or receiving navigational directions.

The occupant identifier may also include one or more animation preferences that may describe preferences associated with animation of the virtual POIs and other objects. For example, an animation preference may include a rotational speed of a POI tag or other object, a relative size of the POI object, a language setting, and/or another animation preference.

The occupant identifier may further include one or more audio preferences, which may describe audio settings such as music, volume, etc. and one or more AR game settings, which may be indicative of preferred AR games playable and/or played by occupants.

The occupant identifier may also include vehicle specific QR information which may indicate unique vehicles associated with occupant identifiers. For example, the occupant identifiers may identify users associated with a vehicle, where the users are also associated with other vehicles operated regularly within a family group and/or a rideshare group. Other information may include device identifiers and other information that may indicate preferred AR settings. The occupant identifier described is not intended to be exclusive or limiting, and merely provides one example of information that may be stored and/or used by the vehicle AR platform 120 and/or the AR device 145 to customize a unique AR experience for a user of the AR device 145.

FIG. 2 illustrates an example AR system 200 that includes a vehicle AR platform 120 having three modules. The vehicle AR platform 120 defines interactions between vehicle occupants 290 and real world features 280 independently, using an interface 400, discussed in more detail in relation to FIG. 4, performs rendering, applies logic that determines which devices (based on users identified with respective AR devices 145) are to receive various content, and serves individualized AR presentations to individual users based on the logic and user identities. These features can allow users to share a common AR experience as the AR expression and rendering are carried out at the system level rather than at the device level, as well as provide a platform for one or more users to change the common AR experience in some way, and share the changed AR with one or more other users in the vehicle. Since changes to the common AR presentation are made in the vehicle AR platform 120 at the AR expression generator 230, they can be shared with various users according to the logic applied, via AR expression controller 231.

Like the automotive computer 110, the AR system 200 or any of its components including the vehicle AR platform 120, any or all of modules 227, 225 and 221, and the AR devices 145 described herein can be implemented in hardware, software (e.g., firmware), or a combination thereof.

Any number of the vehicle occupants 290 may individually use one or more AR devices 145 that may include wearable AR devices 211, mobile AR devices 212, AR screens or HUDs 213, 214, discussed above. The AR devices 145 may be associated with the vehicle occupants 290 by the vehicle AR platform 120 using an occupant identifier system or any available registration system, e.g., through a saved profile. The AR devices 145 may individually connect with the AR presentation module 227, which serves as an interface for the AR devices 145 to communicate information with the vehicle AR platform 120. The AR presentation module 227 may interact with the AR devices 145 to define the user's AR experience. This feature can make the AR experience independent of a particular device, but allow the AR system 200 (and more particularly, the AR presentation module 227) to customize the images and info sent to particular devices 145 according to logic (e.g., the AR expression generator 230) that decides who and what to present based on user preferences, user permissions, user function (e.g., driver vs. rider vs. ridehail payor, etc.).

The AR presentation module 227 can include an AR expression generator 230, an AR expression controller 231, and a rendering module 232. The vehicle AR platform 120, in combination with the AR devices 145, define the interaction between the vehicle occupants 290 and the augmented physical world 280. Either the AR presentation module 227 alone (the interface 400 of FIG. 4), or the full vehicle AR platform 120, may be located within the vehicle 105 coordinating and controlling the AR augmentation for the vehicle 105.

The AR presentation module 227 may further include independent memory having program instructions for communicating information to and from the components of the vehicle AR platform 120 via one or more communications adaptor(s) (not shown in FIGS. 1 and 2). For example, the AR presentation module 227 may create an AR image in the AR expression generator 230 and transmit that image to the rendering module to be displayed overlaying a real world image 280, e.g., an AR arrow over a roadway. The AR presentation module 227 may present the rendered information to less than all of the AR devices 145, based upon permissions or user function. For example, the AR expression controller 231 may recognize that the arrow is only relevant to the driver and may present the AR image only to any driver devices, including navigation screens 214 or AR HUDs 213. If the AR image were a weather alert or traffic delay, the AR presentation module 227 might present the same information to all of the authorized AR devices 145, but the rendered image for each device may be different based on the permissions and preferences of each vehicle occupant 290 and the position of the AR device 145 in the vehicle 105. All AR images may be saved and stored in the data storage and management module 221 associated with a location, e.g., via GPS coordinates, a user, or other occupant identification and re-rendered, as appropriate.

In order to provide different AR devices 145 with different viewing frames, the AR platform 120 associates the vehicle interior with one or more points exterior to the vehicle. As explained in FIG. 1, the optical anchor 170 may be disposed on an interior surface of the vehicle 105. A camera (not shown in FIG. 1 or 2) disposed and/or communicatively coupled with the vehicle AR platform 120 (and the AR devices 145) may track and synchronize the AR world coordinate system 175 with the vehicle coordinate system 160. One or more sensors (e.g., the sensor(s) 125 as shown in FIG. 1 in the vehicle 105, may be used to determine the location and orientation of the vehicle 105 with respect to other features exterior to the vehicle, which may be oriented in 3D space using positioning systems such as a GPS. The individual devices 145 may also capture images of the vehicle interior and exterior that may be communicatively coupled with the vehicle AR platform 120 to further synchronize the AR world coordinate system 175 with the vehicle coordinate system 160 and orient them with the individual devices 145.

The various modules of the vehicle AR platform 120 work in conjunction with the in-vehicle AR device(s) 145 to operate collectively as the AR system 200. For example, the vehicle AR platform 120 can include the data storage and management module 221 for providing the background information and logic expressions necessary to evaluate information and generate the images of the real world and the AR projections. The data collection and processing module 225 may continuously receive and update data allowing the AR experience to be available in real time. For example, the AR devices 145 located in the vehicle 105 may have cameras that capture images of the real world 280. The data from the cameras is collected in the data collection and processing module 225 and processed by the data storage and management module 221 to create updated images in real time of the view being received by the individual AR devices 145. The updated images can be used in conjunction with AR presentation module 227 to generate AR images that are specific to the real world images captured by the cameras of the individual AR devices 145. The AR expression controller 231 in the AR presentation module 227 determines which devices will receive particular AR images and controls the rendering of the various AR images to be superimposed over the real world images.

The AR presentation module 227 not only generates the AR images, but can also retain the permissions relating to those images, renders and distributes the images among the AR devices 145 in the vehicle 105 and determines which, if any AR images should remain persistent to the vehicle or within a particular AR device 145.

As used herein, an image is "persistent" when the image is retained in memory allowing immediate access to the generated AR image when the associated feature or location comes into view. AR images that are generated by an AR device user and provided with associated permissions for distribution are persistent images that are saved for access when the tagged feature or POI is recognized by the sensors.

The data collection and processing module 225 may include software instructions configured for receiving and interpreting sensor information from the sensor(s) 125 (as depicted in FIG. 1). For example, the data collection and processing module 225 may receive data from one or more detecting sensors such as depth cameras, video cameras, a LIDAR, etc., and/or may include computer vision software configured to detect roadside objects based at least in part on the data received from the detecting sensors.

The data collection and processing module 225 may receive data from one or more of a user interface 244, user recognition sensors or a recognition interface, not shown in FIG. 2, reality capture devices including sensors 245, navigation services 243, and space mapping and localization, 248. The data collection and processing module 225 may include software instructions for processing and providing data to the data storage and management module 221. Instructions may include data sharing control 241, the DAT services 242, navigation services 243, the sensor fusion module 246, image processing and the object detection module 247, the data aggregation module 249, and other data or processing services 250, as needed. For example, data that is captured from a user recognition sensor (not shown in FIG. 2) may be collected in the data collection and processing module 225, as user registration ID 240. The system may then recognize the user and couple additional information particular to that user, such as, for example, device recognition, profile, preferences, permissions, and the like via the data aggregation 249 module. The aggregated user data becomes the user data 253 in the data storage and management module 221. The AR presentation module 227 may then access the user data 253 in the data storage and management module 221 via the AR expression controller 231 in the AR presentation module to ascertain whether a particular AR image should be rendered via the rendering module to the particular user or user device 145.

The data storage and management module 221 is communicatively coupled to the data collection and processing module 225. The date storage and management module 221 can include software instructions to manage and process data collected by the data collection and processing module 225. The program instructions stored in the memory can further include logic expressions needed to process data to render real world images that are used by the AR presentation module 227. Examples of data that the data storage and management module 221 may collect can include various information including the navigation data 251, the ADAS data 252, the user data 253, the vehicle identification (ID)

and vehicle-related data 254, the location data 255, the mapping and geographic data 256, the geometric and logic information and data 257, and the use case specific data 258.

The AR expression generator 230 and the AR expression controller 231 in the AR presentation module 227 may rely upon the data stored in the data collection and processing module 225 to control the expression generation and distribution of AR images to the user devices 145. For example, a user may receive an AR image on the user's AR device 145 and may, via user interface 244, change the AR image. For example, the AR device 145 may add additional content to the AR image. The AR presentation module 227 controls the creation of the update AR image via the AR expression generator 230 coupled to the user interface 244. Once the new AR image is created, the AR expression controller 231 can access user data 253 in the data storage and management module to determine what other AR devices 145 are located in the vehicle, what their permissions and preferences include, and determine which devices will receive the updated AR image and whether changes to the image must be made before a particular AR device 145 receives the image.

The AR expression generator 230 controls the modification of any new AR image content. Once the new AR image is appropriate for a particular device, the rendering module renders the new AR image to the particular AR device 145. If the image is appropriate to all AR devices 145 in the vehicle 105, the rendering module can send the image to all devices simultaneously.

In more detail, the AR presentation module 227 collects information from the data collection and processing module 225 and the data storage and management module 221, and performs the AR presentation rendering. Since the individual AR devices 145 are not controlling the AR content they are receiving, the vehicle AR platform 120 can coordinate the experience that each AR device 145 receives. In an on-vehicle AR platform 120, the AR expression generator 230 generates the AR image to be applied to the feature or POI 280 generated from the real world. The AR expression generator 230 may also be used to create AR image content from one or more users of AR devices 145, within or outside of the vehicle, via a user interface 244. The AR expression controller 231 filters the AR expression content and controls which AR devices 145 have access to the AR images.

Accordingly, the AR presentation module 227 may also include a rendering module 232 that may generate and distribute 3D virtual objects that are viewable in the rendering module 232. In one example embodiment, the rendering module 232 may generate a virtual 3D object such as a point-of-interest (POI) tag. A POI tag may be, for example, an animated logo or description of a business operating at a geographic location, where the vehicle AR platform 120 outputs the POI tag as a holographic image that interacts with real-world features and objects 280 as the vehicle 105 approaches the address at which the business operates. One such POI tag may be, for example, an animated graphic of the business logo rotating in a virtual 365-degree rotation at a virtual location that appears in the user's field of view through the I/O adapter of the AR device 145 or might virtually appear above a roof of the business or other geographic point. Or the POI tag may include text or other descriptive information associated with a geographic feature (such as a building, restaurant, museum, mountain, a valley, a bluff, a field, a lake, etc.) or may indicate a vehicle make, model, etc. The POI tag may also identify a social media connection in a passing vehicle or on the roadside, and/or may provide any other type of information of interest to a user. POI tags may also be information presented onboard the vehicle, such a presentation given on a tour bus, or a schematic of a mechanical feature of the vehicle that is accessible by maintenance personnel. Still other types of animations are possible, and contemplated.

Figure 3:
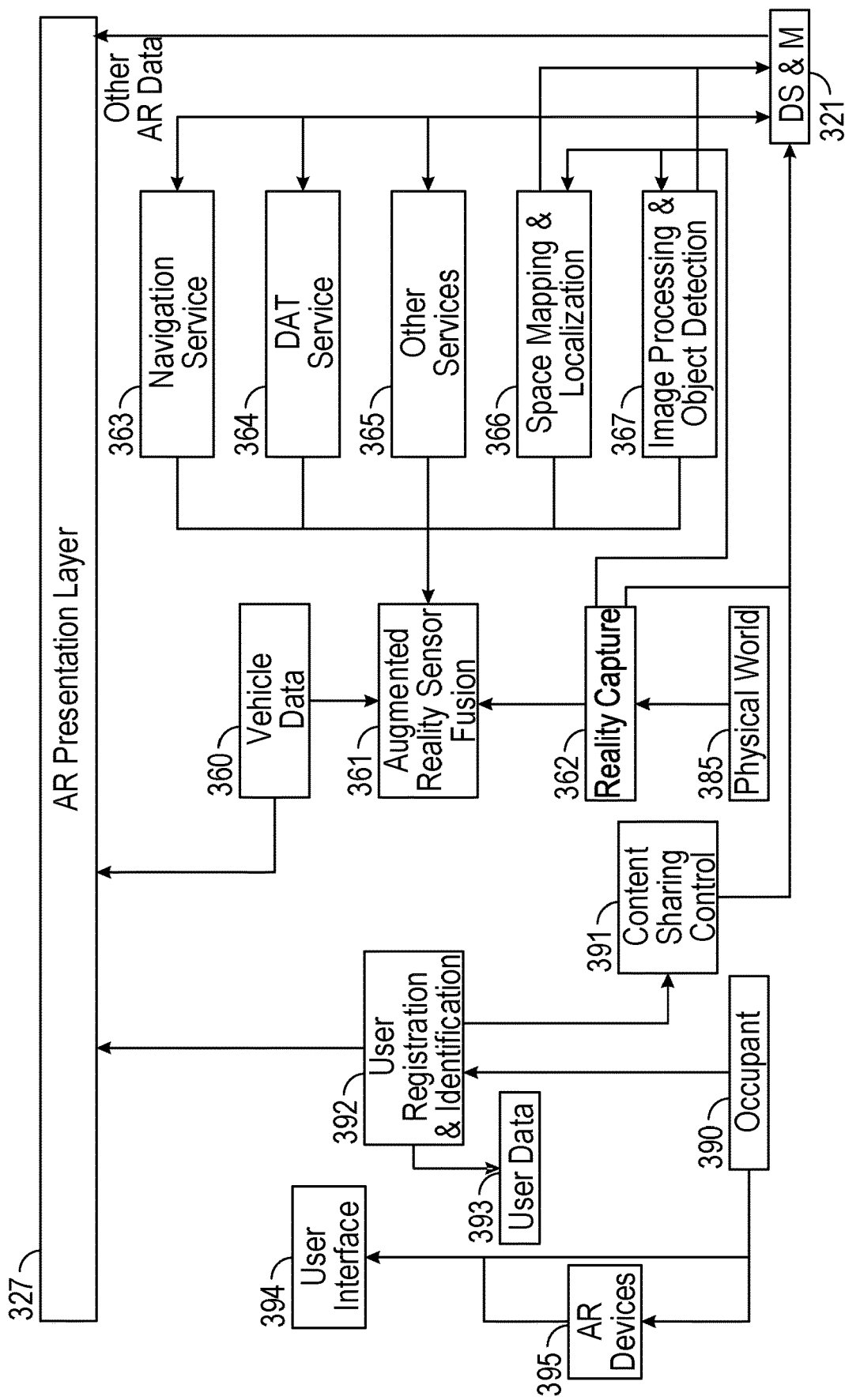
FIG. 3 is a block diagram of an example method of data collection and processing in a system for AR content delivery in accordance with the present disclosure.

FIG. 3 illustrates data acquisition and processing at the AR presentation layer 327 that occurs before the AR images may be generated and rendered. The vehicle occupant 390 provides information regarding the AR device(s) 395 and user data 393 either through a user interface 394 or via a user registration and identification profile 392. The physical world 385 is captured via cameras and other reality capture devices 362. The real world captured information is fused with additional information from the data storage and management module 321. The fused data may include navigation service 363, DAT service 364, space mapping and localization 366, image processing and other object detection 367, and other services 365. The information is fused with the reality capture 362 and the vehicle data 360 to generate "real" world images that are used in the AR presentation layer 327.

The AR device 145 receives images, both real world and AR generated from the AR presentation layer 327 that is part of the in-vehicle AR platform 120. Typically, AR devices handle rendering of AR images as well as generation of AR images in many cases. As each device may render the images differently, currently, a common rendering experience is difficult to achieve. The system described herein however generates and controls the AR system locally within the vehicle 105 with the vehicle AR platform 120 acting as a server or hub for collecting and processing all information related to the AR rendering experience. Because the images are generated and controlled centrally by the AR presentation layer 327, the AR images may be rendered and then distributed to the various AR devices 145, as appropriate based upon user authorization and other information stored in the vehicle AR platform 120.

Once the AR presentation layer 327 receives the user, real world and AR image rendering data (including any other AR data from the data storage and management module 221), the AR projection is ready to be generated, rendered and distributed to AR devices 145 within the vehicle 105 based upon control by the AR expression controller 231 that decides what to present to whom based on user preferences, user permissions, user function (e.g., driver vs. rider vs. ridehail payor, etc.). In addition, because data collection and processing occur locally within the vehicle 105, rendering the real world in real time may be easier as fewer processing lag times exist.

Figure 4:
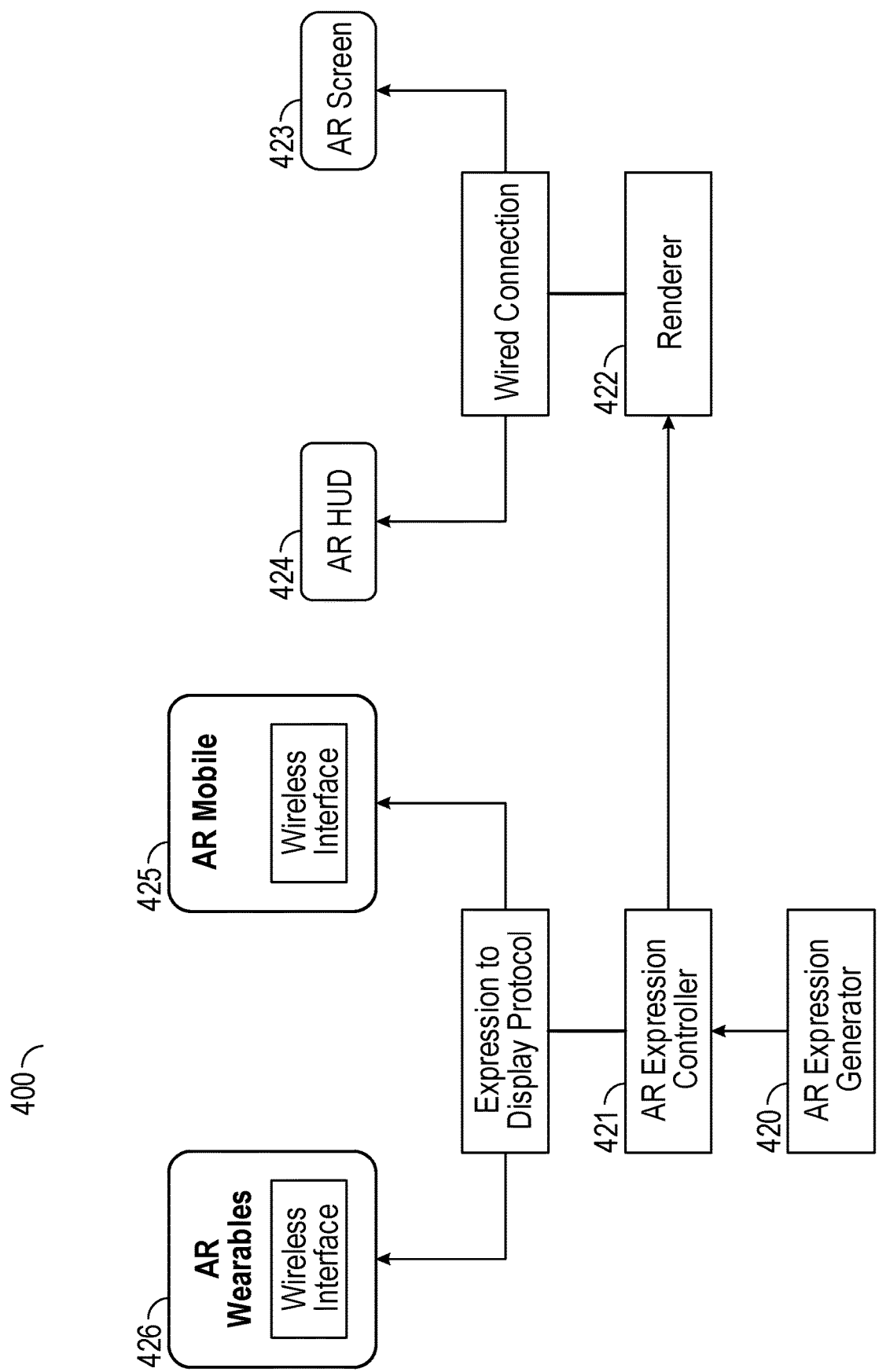
FIG. 4 is a block diagram of an example interface between the AR presentation layer and the AR device layer in a system for AR content delivery in accordance with the present disclosure.

FIG. 4 illustrates the interface 400 between the AR devices 145 and the components of the AR presentation modules (227, 321). AR image content is generated either by the system or a user in the AR expression generator 420. The AR expression generator 420 may generate the content, and the AR expression controller 421 may filter the content to present to particular users. The AR content can then be uploaded wirelessly to the AR wearables 426 and/or the AR Mobile devices 425 or it can be rendered by the renderer 422 and fed to the AR HUD 424 and/or the AR Screen(s) 423 that are wired into the vehicle's navigation system or which may access information via Ethernet or other wired transmission within the vehicle.

For example, the AR expression generator 420 may be configured to generate geometry and/or messages that alert occupants of roadside situations, such as, for example, traffic incidents, road construction, weather alerts, road closures, etc. In the event of a roadside situation, e.g., road construction, the AR expression generator 420, may create an AR image, such as, for example, a road narrowing sign, that may be overlaid upon a picture of the roadway in front of the vehicle 105. The generated AR image would be evaluated by the AR expression controller 421 with respect to the various users in the vehicle, their preferences and permissions and appropriately modified by the AR expression generator 420 and then sent to the appropriate AR devices 145 either wirelessly or via a wired connection. By way of further example, should one of the users require words or pictures that are larger and easier to see, the AR image generated in the AR expression generator 420 may be adapted to appear in a larger size before being displayed to the particular user. So, while the AR experience may be common to all of the AR devices 145 in the vehicle, the experience may also be individual for each user.

Figure 5:
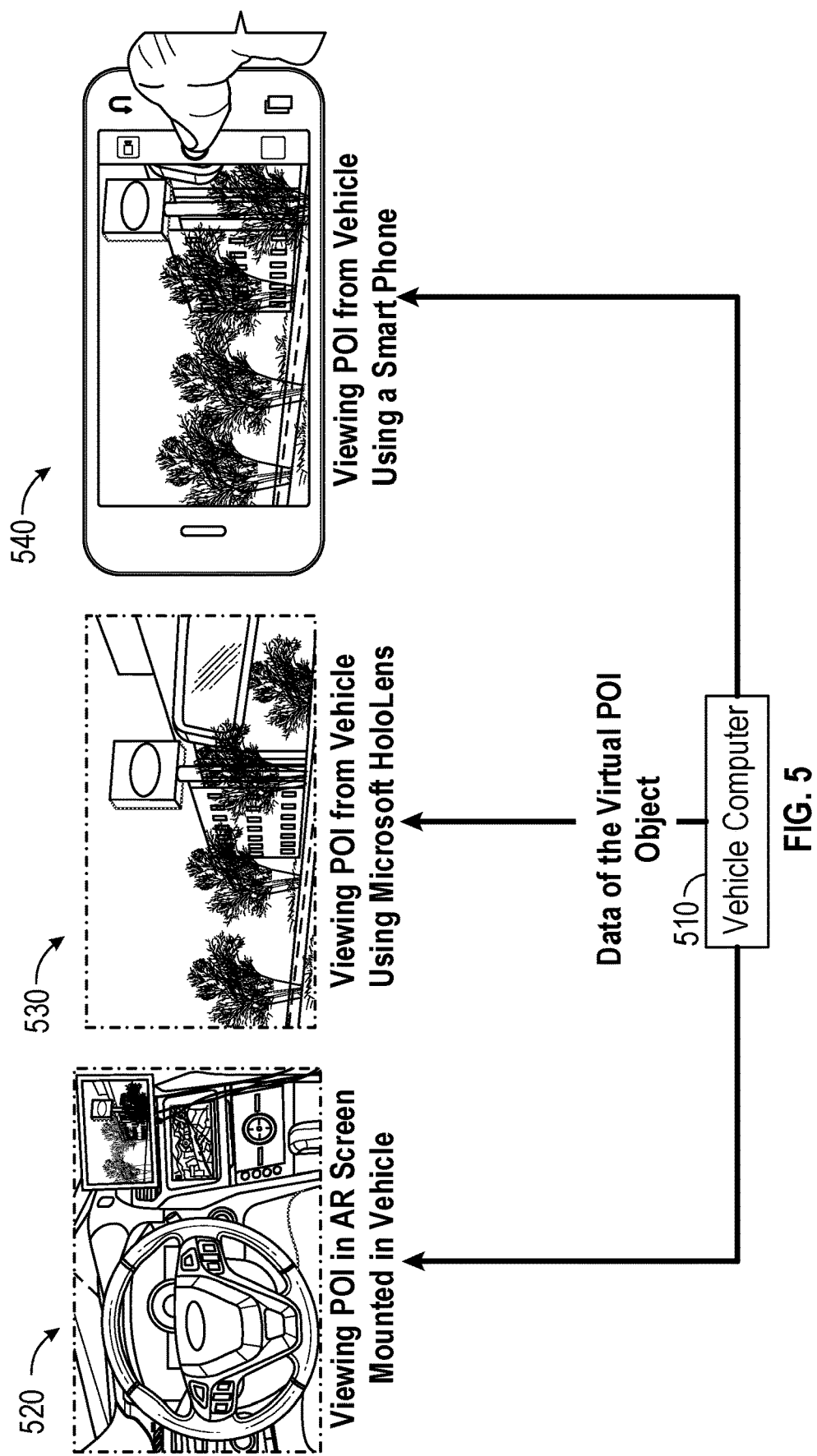
FIG. 5 illustrates AR content in an example method related to AR content delivery in accordance with the present disclosure.

FIG. 5 illustrates a single object retrieved from a vehicle computer 510 and displayed to three different AR devices located in the vehicle 105. The AR presentation module AR image is first displayed as a POI in image 520 on an AR screen located in the center stack of a vehicle. The same AR image is displayed as a POI on a Microsoft HoloLens® or a similar device in image 530. Finally, the same AR image is displayed as a POI from a smart phone in image 540.

Figure 6:
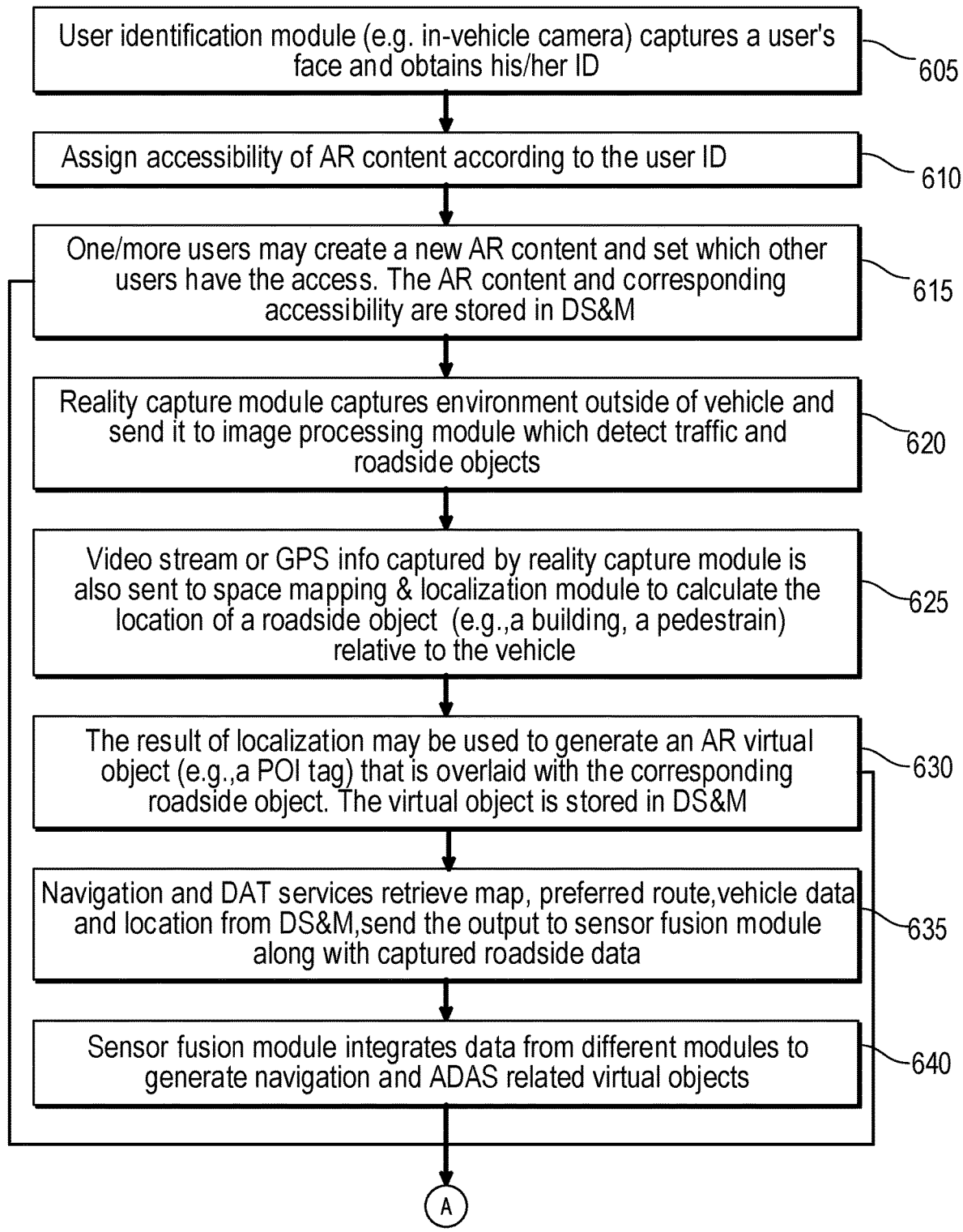
FIG. 6 is a flow chart of an example method related to AR content delivery in accordance with the present disclosure.
Figure 6:
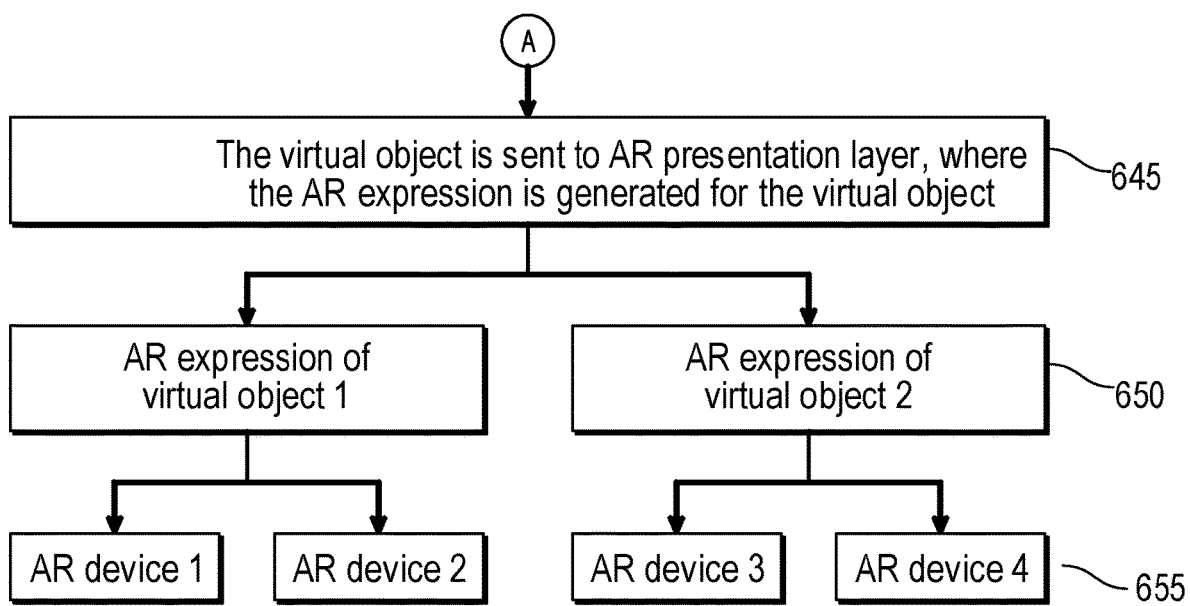

FIG. 6 illustrates a method of using the vehicle AR platform 120 as described with reference to the vehicle AR platform of FIG. 2. A user having an AR device 145 enters a vehicle 105 and a user identification module captures the user's face and obtains the identification of the passenger at step 605. Based upon the identification, the system assigns accessibility of AR content, 610. One or more passengers within the vehicle 105 creates new AR content, provides permissions regarding who may access the new content and the data storage and management module 221, of FIG. 2 stores the information regarding content sharing at step 615. The system than captures the environment outside the vehicle 105 via the reality capture module 245, including sensors, and sends the images to the image processing and object detection module 247, at step 620. Video or GPS captured information is sent to the space mapping and localization module 248 to calculate the location of a roadside object or a POI relative to the vehicle at step 625. The AR expression generator 230 generates AR content, for example, a POI tag, and overlays the roadside object or POI with the AR image and then the data storage and management module stores this virtual object at step 630. At this point, the system navigation services 243, and the DAT services 242 retrieve maps, routes vehicle data and the like which the sensor fusion module 246 combines with the previously saved roadside data at step 635. The sensor fusion module 246 then integrates data from all of the modules and generates navigation and ADAS related virtual objects at step 640. The AR expression controller 231 may then present the virtual objects to the AR presentation module 227 for distribution through the AR system 200 to the AR devices 145 at step 645. Based upon the users' information, one or more expressions of the AR object are created at step 650. The appropriate expression of the AR content is then rendered to the corresponding AR device or devices 145 at step 655.

Yet other advantages may include the ability for AR device 145 users to interact with the AR environments even when exiting the vehicle 105, using the AR device 145 with a wireless or mobile connection through a mobile device (not shown in FIG. 6). Accordingly, the AR device 145 may continue to provide users with an AR experience after users of the AR device 145 exit the vehicle 105. Other advantages are contemplated and possible.

This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular component such as a first processor in a first computer may be performed by another component such as a second processor in another computer.

Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and terms are used herein solely for convenience and such words and terms should be interpreted as referring to various objects and actions that are generally understood in various forms and equivalencies by persons of ordinary skill in the art. For example, words such as "automobile," "vehicle," "car," and "truck" may be used interchangeably and should be understood in the context of the disclosure. Words such as "controls," "signals," "indication," and "information" may be used interchangeably and should be understood in the context of the disclosure. Furthermore, the word "information" as used herein may refer to various items such as digital data, analog data, audio content, video content, and/or messages. These items may be operated upon by a computer containing a processor. Phrases such as "a signal is transmitted" or "a door being opened" should not be construed exclusively in a singular sense. The phrase should be understood to also encompass "a set of signals" that may be transmitted (concurrently or sequentially) to one door and/or to multiple doors. It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Computing devices may include computer-executable instructions, where the instructions may be executable by one or more computing devices such as those listed above. Computer programs may compile or interpret computer-executable instructions using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media.

Databases, data repositories or other data stores described herein may include various kinds of mechanisms for storing, accessing, and retrieving various kinds of data. Example mechanisms for storage may include a hierarchical database, a set of files in a file system, an application database in a proprietary format, a relational database management system (RDBMS), etc. The data stores may also include one or more computing devices, and an operating system such as one of those mentioned above.

In some examples, system elements may be implemented as computer-readable instructions (e.g., software) on one or more computing devices (e.g., servers, personal computers, etc.), and stored on computer readable media associated therewith (e.g., disks, memories, etc.). A computer program product may comprise such instructions stored on computer readable media for carrying out the functions described herein.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telecommunication devices, and the like.

The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed herein can include computer hardware, software, software, or any combination thereof to perform at least a portion of their functions. In one or more non-limiting examples described herein, a sensor may include computer code configured for execution in one or more processors and may include hardware logic/electrical circuitry controlled by the computer code.

While various embodiments of the present disclosure have been described above, it should be understood that the foregoing description has been presented for the purposes of illustration and description. It is not intended to be exhaustive or to limit the present disclosure to the precise form disclosed. Any or all of the aforementioned alternate implementations may be used in any combination desired to form additional hybrid implementations of the present disclosure. For example, any of the functionality described with respect to a particular device or component may be performed by another device or component.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not intended to imply that features, elements, and/or steps are in any way required for one or more embodiments.

That which is claimed is:

1. A method, comprising:
   determining a location of a feature in an external environment relative to a vehicle interior based on reality capture data;
   generating a virtual representation of the feature aligned with the vehicle;
   transmitting the virtual representation to a first augmented reality (AR) device and a second AR device in the vehicle;
   receiving, from the first AR device a modification of the virtual representation provided by a user, wherein the modification includes at least one of: adding content to the virtual representation, modifying content in the virtual representation, or removing content from the virtual representation;
   transmitting a modified virtual representation to the second AR device in the vehicle;
   generating a synchronized vehicle coordinate system associated with a digital representation of a vehicle interior;
   assigning a first coordinate system to a digital representation of the vehicle interior;
   assigning a second coordinate system to a digital representation of an object external to the vehicle;
   synchronizing the first coordinate system and the second coordinate system to Cartesian coordinates based at least in part on an anchor point associated with a vehicle surface; and
   generating the synchronized vehicle coordinate system based at least in part on the Cartesian coordinates.

2. The method according to claim 1, further comprising:
   determining a location of a feature in an external environment relative to a vehicle interior based on reality capture data;
   synchronizing a vehicle coordinate system with a virtual representation of the feature;
   orienting a first AR device with the synchronized vehicle coordinate system;
   orienting a second AR device with the synchronized vehicle coordinate system;
   generating a first virtual representation of the feature aligned with a vehicle GPS location and a vehicle heading;
   overlaying an AR image upon the first virtual representation of the feature; and
   transmitting the first virtual representation having the overlaid AR image to the first AR device and the second AR device.

3. The method according to claim 2, wherein determining the location of the feature in the external environment comprises generating a synchronized vehicle coordinate system associated with a digital representation of a vehicle interior.

4. The method according to claim 3, wherein the generating the synchronized vehicle coordinate system comprises:
   assigning a first coordinate system to the digital representation of the vehicle interior;
   assigning a second coordinate system to a digital representation of an object external to the vehicle; and
   synchronizing the first coordinate system and the second coordinate system to Cartesian coordinates based at least in part on an anchor point associated with a vehicle surface.

5. The method according to claim 1, further comprising:
   determining a location of a feature in an external environment relative to a vehicle interior based on reality capture data;
   synchronizing a vehicle coordinate system with a virtual representation of the feature;
   orienting a first AR device with the synchronized vehicle coordinate system;
   orienting a second AR device with the synchronized vehicle coordinate system;
   generating a first virtual expression of the feature aligned with a vehicle GPS location and a vehicle heading;
   generating a second virtual expression of the feature aligned with a vehicle GPS location and a vehicle heading;
   overlaying an AR image upon the second virtual expression of the feature; and
   transmitting the second virtual expression having the overlaid AR image to the first AR device and the second AR device.

6. The method according to claim 1, further comprising:
   combining reality capture information with user information and stored data to generate a virtual object; and
   generating an AR expression based upon the virtual object.

7. The method according to claim 1, further comprising determining an identity associated with a user of the first or second AR device comprising:
   receiving an image of the user of the first or second AR device;
   generating a plurality of gradient vectors associated with the image of the user;
   identifying at least one facial landmark from the plurality of gradient vectors;
   comparing the at least one facial landmark to a plurality of facial landmarks associated with at least one prior occupant of the vehicle;
   retrieving occupant profile data associated with a match with the at least one facial landmark; and
   changing one or more AR experience settings based at least in part on the occupant profile data.

8. The method according to claim 7, wherein the AR experience settings comprise one or more of a sound setting, a brightness setting, a motion setting, and a character setting.

9. A method, comprising:
   determining a location of a feature in an external environment relative to a vehicle interior based on reality capture data;
   generating a virtual representation of the feature aligned with the vehicle;
   transmitting the virtual representation to all AR devices in the vehicle;
   generating new AR content in one of the AR devices in the vehicle;
   selecting which AR devices in the vehicle have access to the new AR content based on a user profile associated with the AR devices;
   generating a synchronized vehicle coordinate system associated with a digital representation of a vehicle interior;
   assigning a first coordinate system to a digital representation of the vehicle interior;
   assigning a second coordinate system to a digital representation of an object external to the vehicle;
   synchronizing the first coordinate system and the second coordinate system to Cartesian coordinates based at least in part on an anchor point associated with a vehicle surface; and
   generating the synchronized vehicle coordinate system based at least in part on the Cartesian coordinates.

10. A system, comprising:

a processor; and
  a memory for storing executable instructions, the processor configured to execute the instructions to:
    determine a location of a feature in an external environment relative to a vehicle interior based on reality capture data;
    generate a virtual representation of the feature aligned with the vehicle;
    transmit the virtual representation to a first AR device and a second AR device in the vehicle;
    receive, from the first AR device, a modified virtual representation provided by a user, wherein the modification includes at least one of: adding content to the virtual representation, modifying content in the virtual representation, or removing content from the virtual representation;
    transmit the modified virtual representation to the second AR device in the vehicle based on a user profile associated with the second AR device;
    generate a synchronized vehicle coordinate system associated with a digital representation of a vehicle interior;
    assign a first coordinate system to a digital representation of the vehicle interior;
    assign a second coordinate system to a digital representation of an object external to the vehicle;
    synchronize the first coordinate system and the second coordinate system to Cartesian coordinates based at least in part on an anchor point associated with a vehicle surface; and
    generate the synchronized vehicle coordinate system based at least in part on the Cartesian coordinates.

11. The system according to claim 10, wherein the processor is further configured to execute the instructions to:
  determine the location of the feature in the external environment relative to a vehicle interior based on reality capture data;
  generate a virtual representation of the feature aligned with the vehicle;
  transmit the virtual representation to all AR devices in the vehicle;
  generate new AR content in one of the AR devices in the vehicle; and
  select which AR devices in the vehicle have access to the new AR content based on user preferences and permissions associated with the AR devices.

12. The system according to claim 10, wherein the processor is configured to execute the instructions to
  determine the location of the feature in the external environment relative to a vehicle interior based on reality capture data;
  synchronize a vehicle coordinate system with a virtual representation of the feature;
  orient a first AR device with the synchronized vehicle coordinate system;
  orient a second AR device with the synchronized vehicle coordinate system;
  generate a first virtual representation of the feature aligned with a vehicle GPS location and a vehicle heading;
  overlaying an AR image upon the first virtual representation of the feature; and
  transmit the first virtual representation having the overlaid AR image to the first AR device and the second AR device.

13. The system according to claim 10, wherein the processor is configured to execute the instructions to:
  determine a location of a feature in an external environment relative to a vehicle interior based on reality capture data;
  synchronize a vehicle coordinate system with a virtual representation of the feature;
  orient a first AR device with the synchronized vehicle coordinate system;
  orient a second AR device with the synchronized vehicle coordinate system;
  generate a first virtual expression of the feature aligned with a vehicle GPS location and a vehicle heading;
  generate a second virtual expression of the feature aligned with a vehicle GPS location and a vehicle heading;
  overlaying an AR image upon the second virtual expression of the feature; and
  transmit the second virtual expression having the overlaid AR image to the first AR device and the second AR device.

14. The system according to claim 10, wherein the processor is configured to execute the instructions to generate a synchronized vehicle coordinate system associated with a digital representation of a vehicle interior.

15. The system according to claim 14, wherein the processor is configured to execute the instructions to:
  assign a first coordinate system to a digital representation of the vehicle interior;
  assign a second coordinate system to a digital representation of an object external to the vehicle;
  synchronize the first coordinate system and the second coordinate system to Cartesian coordinates based at least in part on an anchor point associated with a vehicle surface; and
  generate the synchronized vehicle coordinate system based at least in part on the Cartesian coordinates.

16. A device, comprising:
a processor; and
  a memory for storing executable instructions, the processor configured to execute the instructions to:
    determine a location of a feature in an external environment relative to a vehicle interior based on reality capture data;
    generate a virtual representation of the feature aligned with the vehicle;
    transmit the virtual representation to a first augmented reality (AR) device, a second AR device, and a third AR device in the vehicle;
    generate in the AR device a modified virtual representation provided by a user, wherein the modification includes at least one of: adding content to the virtual representation, modifying content in the virtual representation, or removing content from the virtual representation; and
    transmit the modified virtual representation to the second AR device instead of the third AR device based on a user profile associated with the second AR device and the third AR device;
    generate a synchronized vehicle coordinate system associated with a digital representation of a vehicle interior;
    assign a first coordinate system to a digital representation of the vehicle interior;
    assign a second coordinate system to a digital representation of an object external to the vehicle;
    synchronize the first coordinate system and the second coordinate system to Cartesian coordinates based at least in part on an anchor point associated with a vehicle surface; and generate the synchronized vehicle coordinate system based at least in part on the Cartesian coordinates.

17. The device according to claim 16, wherein the processor is further configured to execute the instructions to:
determine the location of the feature in the external environment relative to the vehicle interior based on reality capture data;
generate the virtual representation of the feature aligned with the vehicle;
transmit the virtual representation to all AR devices in the vehicle;
generate new AR content in the AR device; and
select which AR devices in the vehicle have access to the new AR content based on user preferences and permissions associated with the AR devices.

18. The device according to claim 16, wherein the processor is further configured to execute the instructions to:
determine a location of a feature in an external environment relative to a vehicle interior based on reality capture data;
synchronize a vehicle coordinate system with a virtual representation of the feature;
orient a first AR device with the synchronized vehicle coordinate system;
orient a second AR device with the synchronized vehicle coordinate system;
generate a first virtual expression of the feature aligned with a vehicle GPS location and a vehicle heading;
generate a second virtual expression of the feature aligned with a vehicle GPS location and a vehicle heading;
overlaying an AR image upon the second virtual expression of the feature; and
transmit the second virtual expression having the overlaid AR image to the first AR device and the second AR device.

19. The device of claim 16, wherein the third AR device is located externally to the vehicle.

* * * * *